Jan. 14, 1958  J. L. S. DALEY ET AL  2,820,081
PRIMARY GALVANIC BATTERY AND METHOD OF MAKING SAME
Filed June 12, 1953
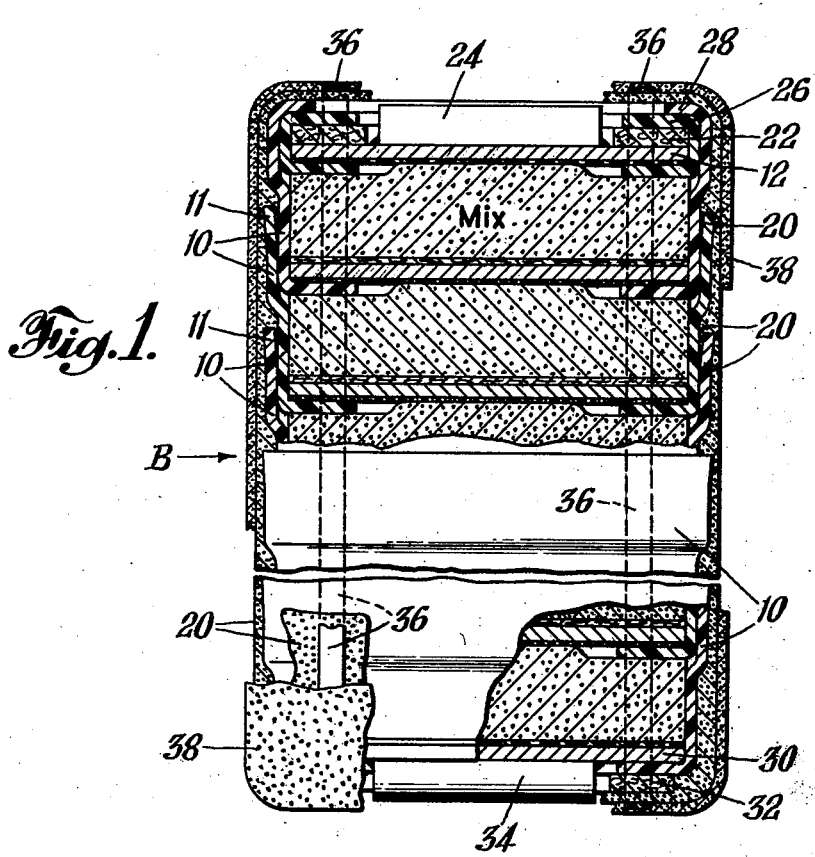
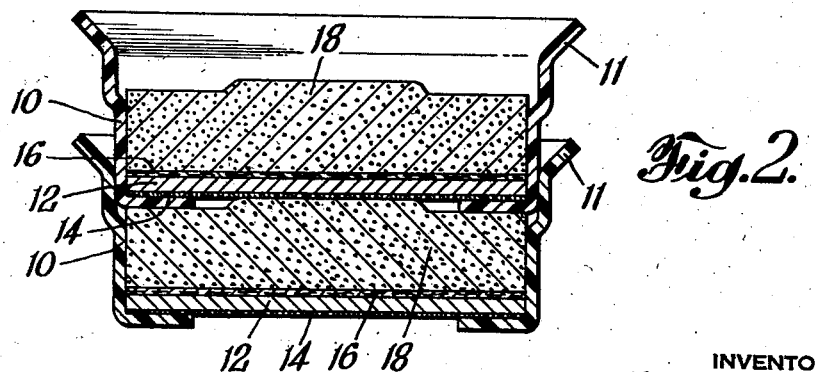
INVENTORS
JOHN L. S. DALEY
DONALD B. CAMERON
BY *John F. Hohmann*
ATTORNEY

2,820,081
PRIMARY GALVANIC BATTERY AND METHOD OF MAKING SAME

John L. S. Daley, Lakewood, and Donald B. Cameron, Bay Village, Ohio, assignors to Union Carbide Corporation, a corporation of New York Application June 12, 1953, Serial No. 361,374

5 Claims. (Cl. 136—111)

This invention relates to a primary galvanic battery comprising a stack of flat cells and to a method of making such a battery.

The multi-cell primary galvanic battery is a familiar article of commerce and one which finds ever-increasing applications. As the demand for these convenient, portable electric power sources has increased it has also presented greater demands for decrease in size of the battery without undue sacrifice in service. Battery manufacturers have kept pace with these demands by structural changes in the batteries, by the use of more active materials, and by the elimination of waste space in individual cells in the battery as well as in the assembled battery itself.

Although these batteries are conventionally referred to as "dry" batteries, of course they contain a substantial quantity of moisture. And this quantity of moisture has necessarily been increased to improve battery life under adverse conditions of use. The increasing wetness of the mix has aggravated the old problems of venting, leakage and retention of moisture during storage.

The principal object of this invention is the provision of improved sealing and venting means for primary galvanic batteries. More specifically the invention has for an object a seal for the individual cells of a stacked multi-cell battery, which seal not only provides for venting excess gas from each of the cells but also inhibits drying out of the mix in the cells. Another object of the invention is an improved method of assembling a stack of cells so as to provide during assembly a vent and seal for each of the cells.

The invention by means of which these objects are achieved will be described with reference to the accompanying drawing in which:

Fig. 1 is a vertical view, partially in section, of an assembled battery embodying the invention; and Fig. 2 is a vertical sectional view of two cells for a battery like that of Fig. 1 stacked in preparation for final assembly according to the invention.

The battery of the invention comprises a stack of trays each containing cell elements assembled in series relationship with a moisture-proof seal between the trays, the seal being operable for relief of gas pressure built up within a cell. Referring to the drawing, a battery B embodying the invention comprises a plurality of open-bottomed trays 10 so formed that the lower portion of each nests within the upper portion of another. The trays 10 are composed of a thermoplastic material as will be described more fully below. In the bottom of each tray except the bottom tray is a conventional duplex electrode, the upper side 12 of anode metal, usually zinc, and the lower side 14 of conductive carbonaceous material. Next to the anode side 12 of the duplex electrode and in intimate contact therewith is a conventional separator 16, for example of bibulous paper, and above this separator is the electrolyte-wet depolarizer mix 18. The trays 10 are so stacked that the carbonaceous side 14 of the duplex electrode of one tray is in contact with the mix 18 of the tray below it. Between overlapping side walls of the trays 10 is the moisture-proof seal and vent 20 of this invention. The formation of this seal and vent will be described in detail below.

The battery B is provided with terminal cells in conventional manner, the "positive cell" at the top comprising a duplex electrode arranged with its carbonaceous side 14 in contact with the mix 18 of the next lower cell and its upper side 12 in contact with an end board 22 suitably of fibrous material having an aperture therein for a conventional terminal 24 in contact with or forming a part of the upper side 12 of the duplex electrode. The end board 22 and duplex electrode of this cell are embraced within an electrically insulating envelope 26 suitably of the same material as the trays 10. The upper edges of the top tray 10 are inwardly turned as shown at 28 to complete the top of the battery B.

As indicated above the bottom cell of the battery B does not contain a duplex electrode but instead is provided with an anode 30. Beneath the bottom of the tray 10 of this cell is an end board 32 of fibrous material with an aperture therein through which a conventional terminal connection 34 to the anode 30 is made. To maintain the stack of cells under compression, tying tapes 36 which may be elastic if desired, embrace the stack. The stack may then be provided with a conventional hard, microcrystalline wax coating 38 by dipping in a molten bath if desired.

In accordance with the invention the battery is provided with sealing and venting means for each of its component cells during assembly. Referring to Fig. 2 of the drawing it will be seen that the trays 10 are initially provided with an outwardly flared portion at their upper ends the flared portions being at an angle of about 30° to 45° for example from the vertical. As has been indicated above the trays 10 are composed of a thermoplastic material, preferably a synthetic organic resin such as a polymer or copolymer of a vinyl derivative. A most satisfactory material is a semi-rigid copolymer of vinyl acetate and vinyl chloride.

The tray 10 is formed in accordance with this invention by warming and stretching a tubular section or band of the selected resin. The temperature of the band during stretching is such that strains caused by the deformation are not released. The trays are then cooled so as to retain their shape as shown in Fig. 2, cell components are inserted and the trays assembled in nesting relationship. The nested stack of cells is placed under endwise compression and then immersed in a warm bath of sealing compound. The sealing compound should be one which remains soft indefinitely in situ such as a soft wax or grease. Petrolatum is a specific material that may be used. Particularly satisfactory materials are described in application Serial No. 361,371 filed concurrently herewith by J. V. Franquemont. The sealing compound enters the gaps between the edges of the trays 10, but the warmth of the bath causes the trays to become less rigid and the outwardly flared highly strained edges relax and tend to return to their original unstrained shape. In doing so they force out excess sealing compound and grip the side walls of the adjacent trays. A thin layer 20 (Fig. 1) of sealing compound is left between the overlapped tray portions effectively sealing each cell. The battery is then removed from the bath, and the tapes 36 are applied to maintain endwise pressure. The completed battery may now be wax-dipped and wrapped in conventional manner.

The seal 20 formed between the cells of the battery B effectively prevents loss of moisture from the depolarizer mix 18 but provides for escape of gas from the individual cells. In the event that any substantial gas pressure is developed in any cell, its seal will yield to relieve the pressure and will reseal after venting because of the permanent tendency of the tray to shrink to its original tubular shape,

What is claimed is:

1. In a multi-cell primary galvanic battery comprising a stack of nested flat cells each contained in a strained thermoplastic tray, an improved seal and vent which comprises a layer of permanently soft sealing compound between overlapping portions of said nested trays, said layer in combination with said strained tray effectively sealing said cells against loss of moisture therefrom but being operable under gas pressure to vent gas from said cells and said strained tray being effective to reseal said cell after venting, said strained tray exerting a closing force on the junction between adjacent trays, and thereby effectively sealing said cell after venting.

2. In a multi-cell primary galvanic battery comprising a stack of nested flat cells each contained in a strained thermoplastic tray, an improved seal and vent which comprises a layer of soft wax between overlapping portions of said nested trays, said layer in combination with said strained tray effectively sealing said cells against loss of moisture therefrom but being operable under gas pressure to vent gas from said cells, and said strained tray then being able to reseal after venting, said strained tray exerting a closing force on the junction between adjacent trays, and thereby effectively sealing said cell after venting.

3. In the manufacture of a primary galvanic battery comprising a stack of flat cells contained in nested trays the improved method which comprises forming trays by deforming a tubular band of thermoplastic synthetic organic resin, providing a highly strained outward flare on the upper side walls of said trays, inserting cell components in said trays, nesting said trays and placing them under endwise compression to form a stack, immersing said stack in a warm bath of permanently soft sealing compound and maintaining said stack in said bath until said outward flare on said side walls of said tray relaxes and grips the side walls of the adjacent tray, thus displacing excess sealing compound from between the side walls of said trays and forming a thin layer of said sealing compound between overlapping portions of said trays, and removing said stack from said bath and applying thereto endwise pressure-maintaining bands.

4. In the manufacture of a primary galvanic battery comprising a stack of flat cells contained in nested trays the improved method which comprises forming trays by deforming a tubular band of thermoplastic synthetic organic resin, providing a highly strained outward flare on the upper side walls of said trays, inserting cell components in said trays, nesting said trays and placing them under endwise compression to form a stack, immersing said stack in a warm bath of soft wax and maintaining said stack in a said bath until said outward flare on said side walls of said trays relaxes and grips the side walls of the adjacent tray, thus displacing excess sealing compound from between the side walls of said trays and forming a thin layer of said sealing soft wax between overlapping portions of said trays, removing said stack from said bath and applying thereto endwise pressure-maintaining bands and coating said stack with microcrystalline wax.

5. In the manufacture of a primary galvanic battery comprising a stack of flat cells contained in nested trays, the improved method which comprises deforming by stretching a tubular band of semi-rigid, thermoplastic synthetic organic resin under the influence of heat to form a tray having side walls substantially vertical but having a highly strained outward flare at their upper portions, cooling the trays so formed to cause them to retain such shape temporarily, inserting cell components into such trays, nesting such trays and forming a stack, applying endwise pressure to said stack, immersing said stack in a warm bath of permanently soft sealing compound and maintaining said stack in said bath until said outward flare portions of said trays relax and grip the vertical portions of the side walls of the nested trays, thus displacing excess sealing compound from between the side walls of said trays and forming a thin layer of said sealing compound between overlapping portions of said trays, anl removing said stack from said bath and applying thereto endwise pressure-maintaining bands.

References Cited in the file of this patent

UNITED STATES PATENTS

| 645,547 | Botz | Mar. 20, 1900 |
| 2,416,576 | Franz et al. | Feb. 25, 1947 |
| 2,480,941 | Lewis et al. | Sept. 6, 1949 |
| 2,483,983 | Quinnell | Oct. 4, 1949 |
| 2,632,784 | Marsal et al. | Mar. 24, 1953 |

FOREIGN PATENTS

| 554,926 | Great Britain | July 26, 1943 |

OTHER REFERENCES

Clark, W. M.: "The Determination of Hydrogen Ions," the Williams & Wilkins Company, Baltimore, 1927, Ed. 2, page 185.